ated Poly (4-methyl-1-pentene).

United States Patent [19]

Shimizu et al.

[11] 4,321,338
[45] Mar. 23, 1982

[54] NOVEL CHLORINATED POLYMER AND COATING COMPOSITION EMPLOYING THE SAME

[75] Inventors: Kazuo Shimizu; Toru Morita, both of Iwakuni, Japan

[73] Assignee: Sanyo-Kokusaku Pulp Co., Ltd., Tokyo, Japan

[21] Appl. No.: 209,276

[22] Filed: Nov. 21, 1980

[30] Foreign Application Priority Data

Nov. 28, 1979 [JP] Japan ................................ 54/153909

[51] Int. Cl.³ .............................................. C08F 8/22
[52] U.S. Cl. .............................. 525/335; 204/159.18; 525/334; 525/356
[58] Field of Search ....................... 525/356, 334, 335; 204/159.18

[56] References Cited

U.S. PATENT DOCUMENTS

| | | | |
|---|---|---|---|
| 3,484,423 | 12/1969 | Borzel et al. | 260/88.2 |
| 3,884,893 | 5/1975 | Kolb | 525/356 |
| 4,012,306 | 3/1977 | Henderson et al. | 525/356 |

FOREIGN PATENT DOCUMENTS 1906320 9/1970 Fed. Rep. of Germany ...... 525/356

OTHER PUBLICATIONS

Jour. Polymer Science "Chlorinated Isotactic Polyhydrocarbons", Campbell et al., pp. 169–180, vol. 55, 1961.
Chem. Abstract, vol. 67, 1967, #3538a, Vulcanizable Chlorinated Poly (4-methyl-1-pentene).

*Primary Examiner*—William F. Hamrock
*Attorney, Agent, or Firm*—Armstrong, Nikaido, Marmelstein & Kubovcik

[57] ABSTRACT

This invention relates to a chlorinated polymer and a coating composition employing the same which is characterized by being comprized of chlorinated polymethylpentene obtained by uniformly chlorinating an isotactic poly-4-methylpentene-1 having the melt index of 8–70 g/10 min. at 260° C. and 5 kg, (ASTM D 1238-65T) in a solution thereof, to not less than 50 weight % of chlorine content.

8 Claims, No Drawings

NOVEL CHLORINATED POLYMER AND COATING COMPOSITION EMPLOYING THE SAME

THE DETAILED EXPLANATION OF THE INVENTION

This invention relates to the novel chlorinated polymer and the coating composition employing the same polymer. More particularly, this invention relates to the novel chlorinated polymethylpentene and the coating composition employing the said polymer which are specially excellent in thermo-resistance and in thermal stability, but yet freely soluble in the inexpensive multipurpose solvent. Due to the fact that chlorinated polyolefins, which have been obtained by chlorinating multi-purpose polymers, such as rubber, polyethylene and polypropylene in a chlorine resistant solvent, are capable of forming films which have excellent weather resistance, water resistance and chemical resistance properties, these chlorinated polyolefins have widely been used as the chief ingredient of coating composition, such as clear lacquer, paint, ink and adhesives. But since the conventional chlorinated polyolefins soften at the temperature in the range of 100°–200° C., the paint, ink, adhesive which had used them as vehicles have been poor in thermo-resistance. Therefore, it has been normal either to use resin which has high softening temperature together with the said chlorinated polyolefines or to use resin with thermo-setting property together with the said chlorinated polyolefines in order to improve the thermo-softening characteristic. For this reason, it has long been desired to improve thermo-resistance of these conventional chlorinated polyolefines.

That is to say, it has been the recent trend to raise the temperature for drying during line painting process or during printing process in order to improve painting operation and also to increase the printing speed. But during these operations, many problems have been encountered such as troubles of blocking, creeping, scratches etc., and deterioration of printing effects which were apparently caused by the softening of coated surface by heat. And not only limited to the softening point, the commonly used conventional chlorinated polyolefins, had such shortcomings as clear film made therefrom have been liable to discolor by the heat or the transmittance of light. In view of above, it has urgently been needed to surmount these poor thermo-stability of the chlorinated polyolefines.

While on the one hand, it has frequently been done to add these conventional chlorinated polyolefins into rubber adhesive for the improvement of creep resistance. Moreover, the creep resistance property at elevated temperature is recently demanded in applications such as automobile and aircraft industries. Therefore, it has long been desired to develop the additive resin having good compatibility with rubber adhesive and having high softening temperature together with more favorable thermo-stability.

On the other hand, it has also been desired to reduce the quantity of solvent remaining in the ink film formed after printing, from standpoints of prevention of atmospheric pollution and of safety and hygiene of working environment. But as the conventional chlorinated polyolefins of prior known art have been poor in solvent release, they have not been satisfactory materials.

As a result of overviewing in various ways to improve the shortcomings inherent in the conventional chlorinated polyolefins of prior known art, the inventors discovered that the chlorinated polymethylpentene, which is comprised of isotactic poly-4-methylpentene-1 with the melt index of 8–70 g/10 min. at a condition of 260° C. and 5 kg (ASTM D 1238-65T) which had been uniformly dissolved into chlorine resistant solvent and which is uniformly chlorinated to not less than 50 weight % of chlorine content in condition of solution thereof, can be dissolved well into the inexpensive multi-purpose solvent such as xylene, toluene, solvesso 100, etc., and moreover has excellent thermo-resistant property and thermo-stable property as compared with those of conventional chlorinated polyolefins.

Chlorinated polymer which is obtained by chlorinating an amorphous polymer obtained by cationic polymerization of 4-methylpentene-1 to the chlorine content in the range of 25–50 weight % has been well known by U.S. Pat. No. 3,484,423 specification.

And, chlorinated polymer containing chlorine content in the range of 5–61 weight % obtained by the suspension chlorination of the finely pulverized isotactic poly-4-methylpentent-1, which is obtained by polymerizing 4-methylpentene-1 with Zielgler-Natta catalyst, in carbon tetrachloride at room temperature, is also well known by Journal of Polymer Science, 55, 169–180, 1961.

Although chlorinated polymers, which have high softening temperature, are available through this suspension chlorination of isotactic poly-4-methylpentene-1 in carbon tetrachloride, with increasing chlorine content of polymers, the thermal stability of those polymers are so inferior than that of conventional chlorine containing polymers such as polyvinylchloride etc., that they tend to decrease their solution viscosity markedly and to show significant decrease in weight caused by the dehydrochlorination when they are heated in air. Thus, about the said polymer, applications of significant advantage have not been found. Therefore, as a result of conducting various experiments on the chlorinating of both the amorphous polymer and the isotactic polymer of 4-methylpentene-1, the inventors of this invention have discovered that chlorinated polymethylpentene which is obtained by uniformly chlorinating the isotactic poly-4-methylpentene-1 having the melt index of 8–70 g/10 min. (ASTM D 1238-65T) at the condition of 260° C. and 5 kg in condition of a solution thereof to not less than 50 weight % of chlorine content is extremely adaptable as a coating ingredient, and come to achieve this invention. That is to say, the inventors studied on the uniform chlorination of the isotactic poly-4-methylpentene-1, which has never been attempted. Then uniformly chlorinated poly-4-methylpentene-1 with desired chlorine content ratio was obtained by completely dissolving isotactic poly-4-methylpentene-1 having the melt index of 8–70 g/10 min. at 260° C. and 5 kg (ASTM D 1238-65T) into carbon tetrachloride under increased pressure at a temperature higher than its boiling point, and by blowing chlorine gas into the solution in which the poly-4-methylpentene-1 was completely dissolved. As a result of closely examining various properties of the chlorinated polymers thus obtained, it was discovered that among these uniformly chlorinated polymers, the polymers with high chlorine content—with the chlorine content of not less than 50 weight %—had a very high softening temperature, which is not at all inferior to that of chlorinated polymer obtained by the said well known non-uniform chlorinating method.

What is more, with respect to thermal stability, it was discovered that the said invented polymer was excellent and more superior even compared with not only the said non-uniformly chlorinated poly-4-methylpentene but also the conventionally well known chlorine containing polymers, such as polyvinyl chloride, chlorinated polyvinyl chloride, chlorinated rubber, chlorinated polyethylene, chlorinated polypropylene, etc. Therefore, the inventors arrived at achieving this invention. While the substance obtained by this invention is a novel chlorinated polymer which is obtained by uniformly chlorinating poly-4-methylpentene-1 which have never heretofore been attempted, various coating compositions were produced using this invented substance in this invention. It was revealed that the invented polymer not only excelled in various properties relating to such as hardness and tenacity but also has favorable heat resistance which could not be achieved by the conventional chlorinated polyolefin. In other words, it was found that the invented polymer had thermal deformation resistance, thermal decomposition resistance and good solvent release. Thus this invention offers novel and useful coating composition for paint, printing ink, over printing varnish, adhesives, etc.

The details of the invention are explained in the following paragraphs:

The invented polymer is prepared by uniformly dissolving the isotactic poly-4-methylpentene-1 having the melt index of 8–70 g/10 min. measured at 260° C. under 5 kg load (ASTM D 1238-65T) into chlorine resistant solvent such as carbon tetrachloride under increased pressure at a temperature higher than the boiling point of the solvent and by blowing chlorine gas into the said solution, maintaining the uniformly dissolved condition throughout the process to chlorinate the polymer to chlorine content above 50 weight %.

Upon preparing the same, the reaction can be smoothly effected in a shorter period of time when organic peroxides or diazo compounds which have been conventionally used as chlorinating catalysts, are used, or when lights or radiations are used.

In this invention, the reason why the melt index of the isotactic poly-4-methylpentene-1 is limited to 8–70 g/10 min. at the temperature of 260° C. under 5 kg lies in the fact that the said isotactic poly-4-methylpentene-1 having this range of melt index value can be uniformly dissolved into chlorine resistant solvent such as carbon tetrachloride within the temperature and pressure ranging from 130° C. and 3.5 kg/cm$^2$ to the normal temperature and normal pressure.

And in this invention, the reason why the chlorine content in the uniformly chlorinated polymer of the isotactic poly-4-methylpentene-1 is limited to above 50 weight % is attributed to the fact that polymers having chlorine content below 50 weight % is not capable of adequately satisfying the thermal property which is the feature of this invention.

As mentioned in the foregoing, the invented substance which is obtained by uniformly chlorinating process in the chlorine resistant solvent, can be separated out of the solvent by conventionally well-known process for instance, steam distillation method, or precipitation method using solvent that cannot dissolve chlorinated polymer (in other words it is non-solvent to the chlorinated polymer), thereafter the separated polymer can be dissolved into solvent which is suitable for end use to give various kind of coating compositions. And, this invented substance can also be used for preparing a objective coating composition by method of directly substituting solvent and others without isolating the invented polymer from the reaction liquor after the above chlorinating.

The results of experiments relating to various properties such as, heat decomposition resistance and heat deformation resistance of the invented substance at high temperatures are indicated in the following tables.

TABLE 1

|  | Weight loss (%) after 40 minutes | |
| --- | --- | --- |
|  | 205° C. | 235° C. |
| Polyvinyl chloride resin | 1 | 22 |
| The invented substance | 2 | 8 |

From above table, it can be recognized that the invented substance displays excellent stability at elevated temperatures.

When polyvinylchloride resin is used in a coating composition, surging dehydrochlorination occurs as the temperature is elevated. In contrast to this, when the invented polymer is used, it does not decompose surgingly as the loss occurs in proportion to the lapse of time (the relationship of elapsed time to the loss is linear).

Next, the invention is explained in detail in accordance with examples.

EXAMPLE 1

200 g each of two types of isotactic polymer of 4-methylpentene-1 having the melt indexes of 8 g/10 min. and 70 g/10 min. (ASTM D 1238-65T) were dissolved into 5 l each of carbon tetrachloride respectively. After these were dissolved well at 110° C. under pressure of 2 kg/cm$^2$, air was purged therefrom, and then chlorinating was performed by blowing chlorine gas into a reactor from its bottom section under the irradiation with light.

In the course of chlorination, some portions of the reaction mixture were taken out occasionally, then they were pulverized through the steam distillation one by one, thus white powders having from 50 wt% of chlorine to ultimate 75 wt% of chlorine were obtained. The chlorine content, the viscosity of the solution, softening temperatures and thermal decomposition resistance of them are indicated in the following table. For the sake of comparison, comparison tests were performed on commercially available chlorinated rubber.

TABLE 2

| Testing Items | Examples | Examples | | | | M.I. = 70 g/10 min. | | Comparative Example Chlorinated Rubber SUPER-CHLON CR-20 |
| --- | --- | --- | --- | --- | --- | --- | --- | --- |
|  |  | A | B | C | D | E | F |  |
|  |  | M.I = 8 g/10 min. | | | | | | |
| Chlorine content (%) |  | 54 | 62 | 66.7 | 72.1 | 59.7 | 65.4 | 65 |
| Viscosity of solution (CP) |  | 100,000 | 11,000 | 610 | 100 | 17,500 | 3,080 | 1,050 |
| Softening temperature (°C.) |  | 250 | 280 | >300 | >300 | 270 | >300 | 195 |
| Thermal discoloring property |  | Slightly | Did not | Did not | Did not | Did not | Did not | Turned into |

TABLE 2-continued

|  |  | Examples |  |  |  |  |  | Comparative Example |
|---|---|---|---|---|---|---|---|---|
|  |  | M.I = 8 g/10 min. |  |  |  | M.I. = 70 g/10 min. |  | Chlorinated Rubber SUPER- |
| Testing Items | Examples | A | B | C | D | E | F | CHLON CR-20 |
|  |  | yellow | discolor | discolor | discolor | discolor | discolor | black |
| Storage stability of varnish | Fluidity at −10° C. | O | O | O | O | O | O | O |
|  | Nail rust | O | O | O | O | O | O | X |

Legends:
1. Viscosity of Solution:
Indicates centipoise of 40 weight % toluene solution at 25° C.
2. Softening temperature:
Measured by melting point measuring apparatus.
3. Thermal discoloring property:
Discoloring after heating at 180° C. for 30 minutes.
4. Storage stability of varnish:
a: Fluidity at −10° C.: Fluidity was tested by preserving at −10° C. and at a room temperature.
O — good
b. Nail rust (corrosion test of nail): A test was done to see whether the rust occurs on the nail immersed in 20% toluene solution for 5 days at a room temperature.
O — No rust observed
X — Rust observed As it can be learned from Table 2, the invented substance is proven to possess very high softening temperature and thermal stability.

Furthermore, in order to clarify this thermal stability quantitatively, the results of measurement made on the relationship between heating time at 162° C. in air oven and weight loss of the substance B in Table 2, commercial polyvinyl chloride resin and commercial chlorinated rubber.

TABLE 3

|  | Resin |  |  |
|---|---|---|---|
| Heating Time | Example B | PVC | Chlorinated Rubber |
| 0 hrs. | 0 | 0 | 0 |
| 5 hrs. | 0 | 0.98 | 1.44 |
| 40 hrs. | 2.81 | 3.05 | 3.84 |
| 75 hrs. | 3.93 | 7.12 | 12.62 |

PVC: Polyvinyl chloride reagent of Katayama Chemical Industry Co., Ltd.
Chlorinated rubber: Commercial products of ICI.

From Table 3, it also can be understood that the invented substance is a novel polymer which suffers less thermal decomposition than the commercial chlorinated rubber and the commercial polyvinyl chloride do.

EXAMPLE 2

(Printing ink)

Gravure printing ink was prepared by using above polymer B of the above example and chlorinated rubber of comparative example. That is, 20% toluene solutions containing 18 g of resin and 72 g of toluene were respectively prepared and to the solution, 10 g of pigment (Carmine 6BN produced by Toyo Ink Manufacturing Co., Ltd.) was added respectively. After mixing these for 2 hours by a sand mill to give printing inks, the inks, which have the same amount of solid component in each of them, were printed on a coating paper to form ink films of 5–6μ. After completely drying films at room temperature, tests were made on color development, thermal resistance and storage stability of the inks.

TABLE 4

|  | Example 2 | Comparative Example (Chlorinated Rubber) |
|---|---|---|
| Color development of the ink | O | O |
| Thermal resistance of the ink surface | 150° C.  V | ◎ | V | O |
| | 160° C.  V | ◎ | V | Δ |
| | 180° C.  V | ◎ | V | X |
| Storage stability | 50° C.  V | O | V | Δ |
| | −10° C.  V | O | V | Δ |

Color development: Judged by color density
O: good color development
Thermal resistance: The printed paper which was overlapped on the printed surface with a sheet of fine paper, was pressed with the heat sealing bar maintained at above mentioned temperature respectively with the pressure of 2 kg/cm² for 10 sec. After cooling for 30 minutes, the fine paper overlapped is peeled off. Judgement was made on the basis of its peeling condition of the paper.
◎: no peel off
O: peeled off less than 5%
Δ: peeled off less than 30%
X: peeled off more than 50%
Storage stability: Observation was made either on the rust from the tin can at 50° C., or the gelling of the ink and the change of fluidity thereof at −10° C.
O: good, Δ: tolerable

EXAMPLE 3

(The solvent release of clear coating film)

As for the coated films, such as that of printing inks, lacqurs, and over printing varnish etc., which usually contain high proportions of resin in them, the rapid solvent release is needed, not only for the fast development of their inherent film properties but also from the stand point of hygiene.

Therefore, the comparison test of solvent releasing property was made on the invented composition as the following.

| Composition: | Resin | 14.0 g |
|---|---|---|
| | Plasticizer (Toyopalax A-40) | 6.0 g |
| | Toluene | 80.0 g |
| | Total: | 100.0 g |

TABLE 5

| | Residual Ratio of Toluene (%) | | | |
|---|---|---|---|---|
| Drying Condition | Resin | Examples | | Comparative Example Chlorinated Rubber |
| | | A | B | |
| 20° C. after 18 hours | | 5.1 | 3.7 | 7.8 |

TABLE 5-continued

| | Residual Ratio of Toluene (%) | | | |
|---|---|---|---|---|
| Drying | | Examples | | Comparative Example Chlorinated |
| Condition | Resin | A | B | Rubber |
| 60° C. after 5 hours | | 1.5 | 1.3 | 3.9 |
| 60° C. after 18 hours | | 0.3 | 0.04 | 1.1 |

Conditions: 5±0.1 g of toluene solution containing 20% resin was precisely weighed and taken over to a 9 cm diameter Petri dish, and measurements were made on the residue after air drying for 18 hours and the residue after drying at 60° C. respectively. The residual amounts of toluene were determined using P-xylene as an internal standard.

EXAMPLE 4

(Over printing varnish)

Using the invented substance indicated as B in Example 1, over printing varnish was prepared compounding small amount of chlorinated paraffin with it. Pencil hardness test was performed on the dried film of the over printing varnish. Concerning chlorinated rubber which has presently been used as quick drying thermal resistant over printing varnish, the same test was performed as reference which was shown as follows.

TABLE 6

| | Pencil Hardness of Dried Film (Room Temperature) | |
|---|---|---|
| | Resin | |
| Chlorinated Paraffin Toyopalax A-40 | Invented Substance | Chlorinated Rubber CR-10 |
| 9:1 | 4 H | 3 H |
| 8:2 | 3 H | H |
| 7:3 | H | HB |

As it can be recognized from Table 6, a coating composition having excellent surface hardness can be obtained by using the invented polymer.

More practically, as the invented polymer is freely compatible with chlorinated rubber, chlorinated polypropylene, etc., it can be advantageously added to the resins which are commonly used in the above mentioned coating compound to improve thermo-blocking resistance and surface hardness.

EXAMPLE 5

(Paint)

A side from the distinctive features already mentioned above, weather resisting property is also essential for paint.

Together with the substances C and E prepared under example 1, using chlorinated rubber, finish coating paints were prepared respectively and the change of whiteness by irradiation of ultra violet rays was traced. The composition of the paint and specimen pieces were prepared in the following manner.

| Composition of paint: | Resin | 21.4 g |
|---|---|---|
| | Plasticizer (Toyopalax A-40) | 9.5 g |
| | Titanium dioxide (R-820) | 26.5 g |
| | Stabilizer (Epikote 828) | 0.5 g |
| | Thixotropic agent (Benton 34) | 1.5 g |
| | Xylene | 40.6 g |

Test specimens were prepared by applying the paint having above composition, which was prepared by a sand mill, with a brush on the primer coated sheet, which was sand-blasted and then was under-coated by "epoxy zinc-rich primer".

After above specimen sheet had been dried with air for 7 days, it is irradiated by 20 watt mercury light at a distance of 30 cm from the specimen pieces and the whiteness was traced at predetermined time intervals.

TABLE 7

| | the Relationship Between Ultra Violet Rays Irradiation Time and The Whiteness (Degree of Whiteness: %) | | | |
|---|---|---|---|---|
| | | Examples | | Comparative Example Chlorinated |
| Irradiation Time | Resin | C | E | Rubber |
| 0 hours | | 81.5 | 83.8 | 85.6 |
| 40 hours | | 77 | 80 | 77 |
| 80 hours | | 76 | 79 | 75 |
| 160 hours | | 75 | 78 | 70 |

As it can be evidently recognized from Table 7, the paint which contains the invented polymer possesses light resistance which is not at all inferior to that of chlorinated rubber.

EXAMPLE 6

(Application as flame retarder)

The following composition having the invented polymer and polyethylene as a flammable polyolefine was subjected to combustion test.

| Composition: | Polyethylene Resin Flo-thene G801 | 42.5 g |
|---|---|---|
| | The invented polymer | 5.0 g |
| | Antimonytrioxide | 2.5 g |
| | Total: | 50.0 |

After blending the above composition well, and compounding for 10 minutes with rolls (surface temperature: 145° C.), the composition was formed into a sheet-like shape (width: 1 cm, thickness: 1 mm and length: 10 cm), on which the combustion test was performed in accordance with the requirements of JIS K-6911.

TABLE 8

| | Combustion Test Results | | | | |
|---|---|---|---|---|---|
| | Example | | | Comparative Example | |
| | Flame Retarder | | | Poly- | Polyethylene (45 g) $Sb_2O_3$ |
| Test Item | A | B | E | ethylene | (5 g) |
| Combustion time (sec.) | 5.1 | 2.1 | 3.5 | ∞ | ∞ |
| Combustion Distance (cm) | 6.3 | 4.8 | 5.9 | ∞ | ∞ |
| Self-extinguishing Property | Yes | Yes | Yes | No | No |

From above results, it was discovered that the invented substance has the advantage of giving self-extinguishing property to flammable plastic (polyethylene) and also has additional advantages when is compared with chlorinated paraffin which is commonly used for this application, by showing no melt flow of the specimens during the test.

By making use of these distinctive features, the invented substance is capable of making flame retardant paint with the least discoloring property and excellent melt flow resistance against the flaming.

We claim:

1. A chlorinated polymer which is characterized by being essentially a chlorinated polymethylpentene obtained by uniformly chlorinating an isotactic poly-4-methylpentene-1 having the melt index of 8–70 g/10 min. at a condition of 260° C. and 5 Kg (ASTM D 1238-65T) to chlorine content of not less than 50 weight % in condition of solution thereof.

2. A chlorinated polymer according to claim 1, which is characterized by dissolving uniformly the isotactic poly-4-methylpentene-1 into an anti-chlorinating solvent at a temperature of more than the boiling temperature of the solvent under an increased pressure, and chlorinating the poly-4-methylpentene-1 by introducing chlorine gas into the obtained solution thereof, maintaining a condition wherein the poly-4-methylpentene-1 being uniformly dissolved in the solvent throughout the chlorinating process.

3. A chlorinated polymer according to claim 1 or 2, wherein the anti-chlorinating solvent is carbon tetrachloride.

4. A chlorinated polymer according to any one of claim 1 or 2, wherein the chlorinating process is carried out at a presence of catalyst for chlorination selected from organic peroxides, diazo compounds, lights and radiations.

5. A coating composition which is characterized by containing a chlorinated polymethylpentene which is obtained by uniformly chlorinating an isotactic poly-4-methylpentene-1 having a melt index of 8–70 g/10 min. at a condition of 260° C. and 5 Kg (ASTM D 1238-65T) to chlorine-content of not less than 50 weight % in condition of solution thereof.

6. A coating composition according to claim 5, wherein the chlorinated polymethylpentene is separated out of solution thereof and is dissolved into a suitable solvent for coating composition to give the coating composition.

7. A coating composition according to claim 5, wherein the chlorinated polymethylpentene is directly dissolved into a suitable solvent for coating composition by substituting solvents therebetween to give the coating composition.

8. A chlorinated polymer according to claim 3 wherein the chlorinating process is carried out at the presence of catalyst for chlorination selected from organic peroxides, diazo compounds, lights and radiations.

* * * * *

UNITED STATES PATENT AND TRADEMARK OFFICE
CERTIFICATE OF CORRECTION

PATENT NO. : 4,321,338
DATED : March 23, 1982
INVENTOR(S) : SHIMIZU et al

It is certified that error appears in the above-identified patent and that said Letters Patent is hereby corrected as shown below:

In the ABSTRACT, line 6, insert --load-- after "5 kg".
Column 1, line 33, insert --the-- after "improved".
Column 1, line 46, delete "liable" and insert therefor --labile--.
Column 2, lines 5, 47 and 56, insert --load-- after "5 kg".
Column 2, line 64, delete "___" between "content" and "with".
Column 3, lines 9 and 10, delete "invention" and insert therefor --intention--.
Column 3, line 44, after "5 kg", insert --load--.
Column 4, line 43, delete "1" and insert therefor --ℓ (liter)--.
Columns 3 and 4, after the last line of TABLE 2, under "slightly", insert -yellow--; same columns, same line, same TABLE, under each appearing "Did not", insert --discolor--; and same columns, same line, same TABLE, under "Turned into", insert --black--.
Column 6, in TABLE 4-continued, lines 27-31, delete any appearing "V". This includes "V"s in the left and right sides of "TABLE 4-continued."
Column 7, before the last line, which is a solid, continuous line, insert --Total 100.0 g-- at the right-hand margin.

UNITED STATES PATENT AND TRADEMARK OFFICE
CERTIFICATE OF CORRECTION

PATENT NO. : 4,321,338
DATED : March 23, 1982
INVENTOR(S) : SHIMIZU et al

It is certified that error appears in the above-identified patent and that said Letters Patent is hereby corrected as shown below:

Column 8, lines 16-17, delete "_____" in "Chlorinated Rubber" in Table 7.
Column 8, line 40, insert --g-- after "50.0".
Column 8, TABLE 8, lines 52-53, move " Flame Retarder" from its position under "Example" and insert this --Flame Retarder-- at the left margin in Table 8 above "Test Item".

Signed and Sealed this

Eighth Day of June, 1993

Attest:

MICHAEL K. KIRK

Attesting Officer

Acting Commissioner of Patents and Trademarks